United States Patent
Fang

(10) Patent No.: US 9,495,343 B2
(45) Date of Patent: Nov. 15, 2016

(54) HORIZONTAL AND VERTICAL LINE DETECTION AND REMOVAL FOR DOCUMENT IMAGES

(71) Applicant: KONICA MINOLTA LABORATORY U.S.A., INC., San Mateo, CA (US)

(72) Inventor: Gang Fang, Redwood City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 71 days.

(21) Appl. No.: 14/502,796

(22) Filed: Sep. 30, 2014

(65) Prior Publication Data

US 2016/0092417 A1  Mar. 31, 2016

(51) Int. Cl.
G06K 9/46 (2006.01)
G06F 17/24 (2006.01)
G06K 9/00 (2006.01)
G06K 9/38 (2006.01)

(52) U.S. Cl.
CPC ........... *G06F 17/24* (2013.01); *G06K 9/00449* (2013.01); *G06K 9/38* (2013.01); *G06K 9/4638* (2013.01); *G06K 9/4642* (2013.01)

(58) Field of Classification Search
None
See application file for complete search history.

(56) References Cited

U.S. PATENT DOCUMENTS

| | | | | |
|---|---|---|---|---|
| 2002/0051575 A1* | 5/2002 | Myers | ................... | G06K 9/3258 382/202 |
| 2003/0133608 A1* | 7/2003 | Bernstein | ............. | H04N 1/4097 382/163 |

OTHER PUBLICATIONS

Kavallieratou; "Ruling line detection and removal"; Proc. of SPIE-IS&T Electronic Imaging, vol. 7874, Jan. 2011, pp. 1-7.*
K R et al., "Line Removal and Restoration of Handwritten Strokes", Conference on Computational Intelligence and Multimedia Applications, 2007, p. 208-214. published before this application Sep. 2014.
ABD-Almageed et al., "Page Rule-Line Removal using Linear Subspaces in Monochromatic Handwritten Arabic Documents",10th International Conference on Document Analysis and Recognition, 2009, p. 768-772. published before this application Sep. 2014.
Extended European Search Report in counterpart application EP 15179577.0, dated Apr. 13, 2016.
Manmatha et al., "A scale space approach for automatically segmenting words from historical handwritten documents", IEEE Transactions on Pattern Analysis and Machine Intelligence, Aug. 2005, vol. 27 Issue:8.

\* cited by examiner

*Primary Examiner* — Eueng-Nan Yeh
(74) *Attorney, Agent, or Firm* — Chen Yoshimura LLP

(57) ABSTRACT

A vertical and horizontal line detection method for document images includes generating multiple binary images from the input grayscale document image based on multiple binarization thresholds, detecting horizontal and vertical lines in each of the multiple binary images independently, and merging the detection results from the multiple binary images. The line detection process for each binary image include applying an opening operation using a vertical or horizontal line as the structuring element, and removing connected components that are not vertical or horizontal lines based on a stroke width analysis. The boundaries of the detected lines are obtained using horizontal and vertical projections.

12 Claims, 3 Drawing Sheets

HORIZONTAL AND VERTICAL LINE DETECTION AND REMOVAL FOR DOCUMENT IMAGES

BACKGROUND OF THE INVENTION

Field of the Invention

This invention relates to document image processing, and in particular, it relates to methods for detecting and removing horizontal and vertical lines in a document image.

Description of Related Art

Document images typically refer to digital images representing pages of documents which contain significant amount of text. Document images often contain lines, in particular horizontal and vertical lines, such as table lines, underline for text, etc. As characters (letters and other symbols) are typically the focus of document image analysis, such as optical character recognition (OCR), document authentication, etc., it is often desired to remove the lines. These lines are usually long in one direction and may cause errors and mistakes in the connected component analysis that followed if they are not removed clearly. Various methods for line detection and removal have been proposed, such as Hough transform, run length coding, morphology analysis, etc. However, when these methods are applied on real documents, they are often affected by the image quality and how well the image is binarized. For example, improper binarization threshold may cause morphology based line detection to fail.

SUMMARY

The present invention is directed to a line detection and removal method and related apparatus that substantially obviates one or more of the problems due to limitations and disadvantages of the related art.

An object of the present invention is to provide a line detection and removal method that can detect horizontal and vertical lines in document image of various quality.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for detecting and removing vertical and horizontal lines in a grayscale document image, which includes: generating a plurality of binary images from the grayscale document image using a plurality of different binarization conditions; detecting horizontal and vertical lines in each of the plurality of binary images independently, to generate a plurality of sets of bounding boxes corresponding to the plurality of binary images, each set of bounding boxes including a plurality of bounding boxes each representing a detected vertical or horizontal line; merging the plurality of sets of bounding boxes into one merged set of bounding boxes representing vertical and horizontal lines detected in the grayscale image; generating another binary image form the grayscale document image; and processing the other binary image to remove horizontal and vertical lines form it using the merged set of bounding boxes representing the detected lines.

In the above method, the detecting step for each binary image may include: (a) obtaining a stroke width associated with each pixel of the binary image, wherein the stroke width associated with a given pixel is defined as a smaller one of horizontal and vertical runlengths of consecutive foreground pixels that include the pixel; (b) performing an opening operation on the binary image using a vertical line as a structuring element; (c) extracting connected components from the binary image generated by step (b); (d) for each vertical column of pixels in each connected component, computing a ratio of a height of the column to a median value of the stroke widths associated with all pixels in the column, and removing the column of pixels from the binary image if the ratio is smaller than a predetermined threshold; (e) projecting the binary image generated by step (d) vertically to generate a vertical projection histogram, and obtaining horizontal boundaries of all non-zero sections of the vertical projection histogram as left and right boundaries of the detected vertical lines; (f) for each non-zero section of the vertical projection histogram, projecting a corresponding vertical slice of the binary image generated by step (d) horizontally to generate a first horizontal projection histogram, and projecting a corresponding vertical slice of the binary image prior to step (b) horizontally to generate a second horizontal projection histogram; and (g) for each non-zero section of the first horizontal projection histogram, identifying a corresponding non-zero section of the second horizontal projection histogram, and obtain its top and bottom boundaries as the top and bottom boundaries of the detected vertical line.

In another aspect, the present invention provides a method for detecting and removing vertical lines in a binary document image, which includes: (a) obtaining a stroke width associated with each pixel of the binary image, wherein the stroke width associated with a given pixel is defined as a smaller one of horizontal and vertical runlengths of consecutive foreground pixels that include the pixel; (b) performing an opening operation on the binary image using a vertical line as a structuring element; (c) extracting connected components from the binary image generated by step (b); (d) for each column of pixels in each connected component, computing a ratio of a height of the column to a median value of the stroke widths of all pixels in the column, and removing the column of pixels from the binary image if the ratio is smaller than a predetermined threshold; (e) projecting the binary image generated by step (d) vertically to generate a vertical projection histogram, and obtaining horizontal boundaries of all non-zero sections of the vertical projection histogram as left and right boundaries of the detected vertical lines; (f) for each non-zero section of the vertical projection histogram, projecting a corresponding vertical slice of the binary image generated by step (d) horizontally to generate a first horizontal projection histogram, and projecting a corresponding vertical slice of the binary image prior to step (b) horizontally to generate a second horizontal projection histogram; (g) for each non-zero section of the first horizontal projection histogram, identifying a corresponding non-zero section of the second horizontal projection histogram, and obtain its top and bottom boundaries as the top and bottom boundaries of the detected vertical line; (h) processing the binary image to remove vertical lines form it using the left, right, top and bottom boundaries of the detected vertical lines.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a vertical and horizontal line detection method for document images, which generates multiple binary images from the input grayscale document image based on multiple binarization thresholds, detects horizontal and vertical lines from each of these multiple binary images independently using the same procedure, and merges the detection results. The line detection process for each binary image applies a stroke width analysis.

This line detection process is highly effective. Typically, line detection results are affected by how the gray scale image is binarized. If the binary image is too light, some thin lines may disappear in the binary image and cannot be detected. If the binary image is too dark, some lines will become too thick and/or merge with neighboring lines or other image components, causing them to be judged as not being a line. It is often difficult to judge the input image correctly to set an appropriate binarization threshold. Thus, by using the multiple binarization technique described herein, and merging the line detection result from multiple binarized images, vertical and horizontal lines can be effectively detected in document images of various quality.

The horizontal and vertical line detection and removal method is described with reference to FIGS. 1 to 2A. The input document image is a grayscale image, where each pixel has a multi-bit pixel value, for example, from 0 to 255. If the original image (e.g. an image generated by a scanner) is a color image, it may be converted to a grayscale image first; alternatively, each color channel may be treated as a grayscale image.

Figure 1:
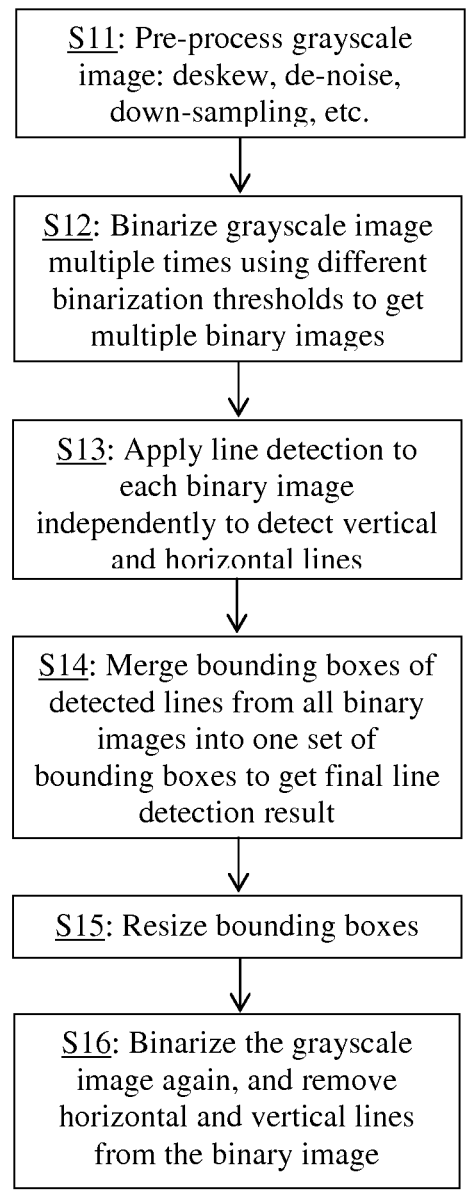
FIG. 1 schematically illustrates a vertical and horizontal line detection and removal method for document images according to embodiments of the present invention.
Figures 2, 2A:
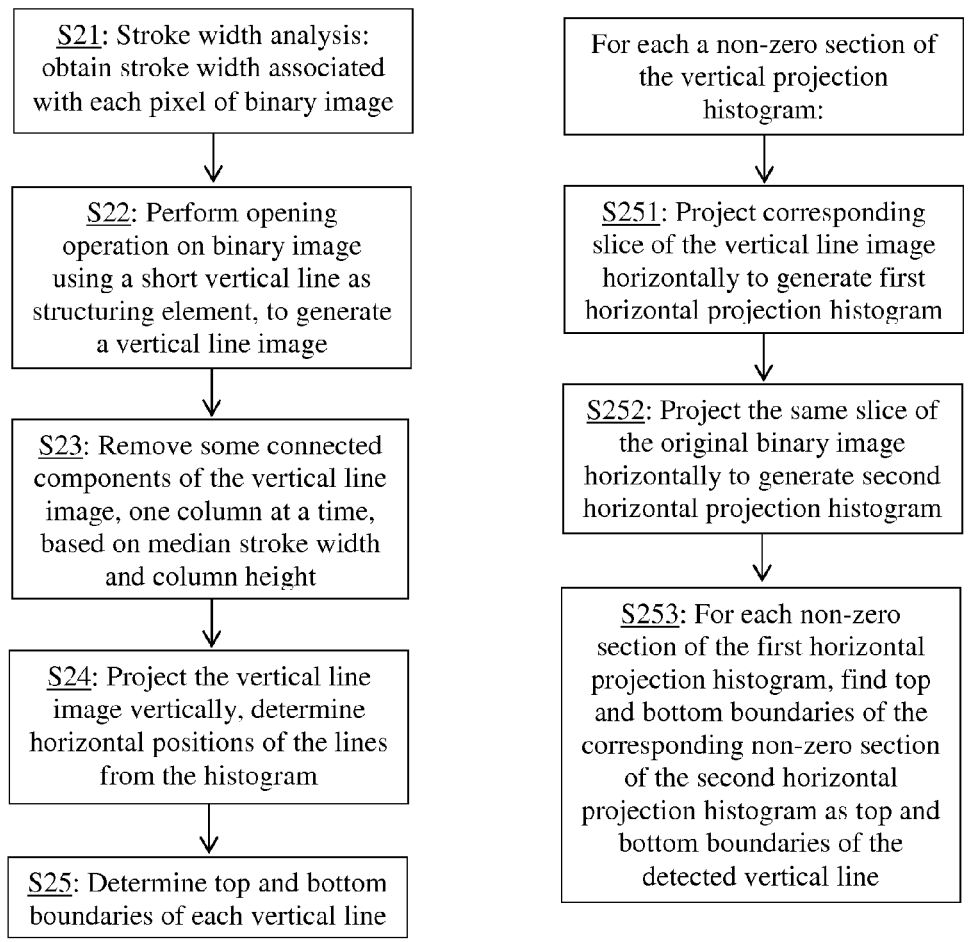
FIGS. 2 and 2A schematically illustrate the line detection process of the method of FIG. 1.
Figure 3:
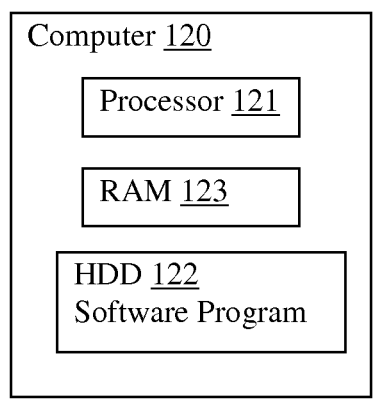
FIG. 3 schematically illustrates a data processing apparatus in which embodiments of the present invention may be implemented.

As shown in FIG. 1, first, pre-processing is optionally applied to the grayscale input image, including deskew, de-noise, down-sampling, etc. (step S11). For convenience, the pre-processed grayscale image is still referred to as the input grayscale image.

The input grayscale image is binarized multiple times, each time using different global binarization thresholds, to obtain multiple binary images (1-bit images) (step S12). The binarization thresholds can be any value from 1 to 254. For an input grayscale image that is relatively light, a set of relatively low thresholds values may be used, while for an input grayscale image of normal darkness, relatively higher threshold values are desired. Any desired number of binary images may be used. In typical applications, three different binary images are sufficient to give satisfactory results. As an alternative to using different binarization thresholds, the multiple binary images may be generated by adjusting other binarization parameters if the binarization algorithm uses other parameters, or by applying different binarization algorithms.

A line detection process is applied independently to each of the binary images (process S13), and the results—the detected lines—from all binary images are merged together to produce the final line detection result (step S14).

In this disclosure, the background is assumed to be white with pixel value 0 and the foreground (text, graphics, etc.) is assumed to be black with pixel value 1. Note that the definition of pixel values for black vs. white and text vs. background is a matter of choice; the implementation described here can be easily modified to adapt to different pixel value definitions.

The line detection process S13 applied to each binary image is described below with reference to FIGS. 2 and 2A.

First, a stroke width analysis is carried out to obtain a stroke width associated with each pixel of the binary image (step S21). Here, the stroke width associated with a given pixel is defined as the smaller one of the runlengths of consecutive black pixels in the horizontal and vertical directions that include the given pixel. The stroke width for a white pixel (background) is zero. If a black pixel is a part of a line or character stroke, the stroke width will tend to be on the same order as a typical width of a line or character stroke in the document. If a black pixel is a part of a graphic element, its stroke width will tend to be much larger. The stroke widths will be used in various steps of the line detection process later.

An opening operation is performed on the binary input image using a vertical line as the structuring element (step S22). Opening is a morphological operation which involves an erosion followed by a dilation using the same structuring element. Opening operation can be thought of as extracting those image elements of the binary image that the structuring element can fit into. Preferably, in step S22, the structuring element is a relatively short vertical line. In one particular implementation, the structuring element is 25 pixels long and 1 pixel wide. Other lengths may be used, such as from 10 to 100 pixels. The resulting binary image is referred to as the filtered image for convenience.

Next, the connected components of the filtered image are extracted, and an analysis is carried out to remove certain connected components or parts thereof, one column at a time, based on median stroke width and column height (step S23). In this step, for each connected component, all 1-pixel wide vertical column of pixels contained in it are enumerated. Along each pixel column, the stroke width for the pixels along the column are retrieved from the result of step S21 and the median value of these stroke widths for the column is computed. If the ratio of the height of the column to this median value of the stroke width is greater than a predetermined threshold value, the column of pixels are kept as a part of a real line. Otherwise, the column of pixels are deemed not to be a part of a real line and are removed. In one example, the predetermined threshold value is 20, but other suitable values may be used, such as between 10 and 30. Although in this step each column of pixel is processed separately, the result is that the entire connected component will be removed if it is not in fact a vertical line. The resulting image is referred to as the vertical line image for convenience.

Next, the horizontal positions of the vertical lines are determined (step S24). To accomplish this, the vertical line image from step S23 is projected vertically, and a histogram of the projection (referred to as the vertical projection histogram) is obtained. Each non-zero section of the vertical projection histogram corresponds to a vertical line (or multiple vertical lines merged together). By analyzing this histogram, the horizontal positions and widths of the vertical lines are obtained (step S24).

The next set of steps determines the top and bottom boundaries of each vertical line (steps S251 to S253, collectively step S25). For each non-zero section of the vertical projection histogram, a corresponding vertical slice of the vertical line image, which is a vertical slice of the image at a horizontal position corresponding to the non-zero section of the vertical projection histogram, is projected horizontally to generate a histogram for this image slice (referred to as the first horizontal projection histogram) (step S251). Meanwhile, the same slice of the original binary image (i.e. the binary image before the opening operation) is also projected in the horizontal direction to generate another histogram (referred to as the second horizontal projection histogram) (step S252). The second horizontal projection histogram will have non-zero sections that correspond in vertical position to non-zero sections in the first horizontal projection histogram, as well as (likely) other non-zero sections which correspond to other components of the original binary image that are not vertical lines. Thus, for each non-zero section of the first horizontal projection histogram, the corresponding non-zero section of the second horizontal projection histogram is identified, and its top and bottom boundaries are obtained as the top and bottom boundaries of the detected vertical line at this location (step S253).

Steps S251 to S253 are performed for all non-zero sections of the vertical projection histogram. As a result, all vertical lines in the binary image are identified and their four boundaries are obtained.

This concludes vertical line detection for a given binary image. As result, the bounding box of each vertical line is obtained.

Horizontal lines in the binary image can be detected using steps similar to steps S22 to S253 with appropriate modifications, i.e., by switching vertical and horizontal (including top/bottom and left/right, vertical column and horizontal row) in each step. The stoke widths calculated in step S21 can be used in horizontal line detection so step S21 does not need to be repeated.

After the vertical and horizontal line detection steps are performed for all of the multiple binary images, the detected lines (bounding boxes) from all binary images are compared and merged into one set of bounding boxes, which constitutes the output of the vertical and horizontal line detection process (step S14, FIG. 1). When merging, if a bounding box from one binary image is completely located within a bounding box from another binary image, the first bounding box is omitted; if two bounding boxes from two different binary images substantially overlap, i.e. at least 50% of one of them overlaps the other one, the two bounding boxes are replaced by a new bounding box that bounds both of them.

Referring back to FIG. 1, if the grayscale input image has been down sampled in step S11, the bounding boxes of the detected lines are re-sized back to the original size of the grayscale input image (step S15). Using the line detection result, a clean binary image can be generated where long vertical and horizontal lines are removed (step S16). In the removing step, all vertical lines with a larger height over width ratio are removed. For horizontal line removal, the method should be designed to remove horizontal lines including text underlines while preserving text strokes that intersect with the underlines. For example, a line removal method described in commonly owned patent application entitled "Horizontal and Vertical Line Detection and Removal for Document Images" U.S. Ser. No. 14/502,820 may be used.

The horizontal and vertical line detection and removal method described here can be implemented in a data processing system such as a computer 120 as shown in FIG. 4. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

In one aspect, the invention is a method carried out by a data processing system. In another aspect, the invention is computer program product embodied in computer usable non-transitory medium having a computer readable program code embedded therein for controlling a data processing apparatus to carry out the method. In another aspect, the invention is embodied in a data processing system.

It will be apparent to those skilled in the art that various modification and variations can be made in the horizontal and vertical line detection and removal method and related apparatus of the present invention without departing from the spirit or scope of the invention. Thus, it is intended that the present invention cover modifications and variations that come within the scope of the appended claims and their equivalents.

What is claimed is:

1. A method for detecting and removing vertical and horizontal lines in a grayscale document image, comprising:
    generating a plurality of binary images from the grayscale document image using a plurality of different binarization conditions;
    detecting horizontal and vertical lines in each of the plurality of binary images independently, to generate a plurality of sets of bounding boxes corresponding to the plurality of binary images, each set of bounding boxes including a plurality of bounding boxes each representing a detected vertical or horizontal line;
    merging the plurality of sets of bounding boxes into one merged set of bounding boxes representing vertical and horizontal lines detected in the grayscale image; and
    processings a binary image generated from the grayscale document image to remove horizontal and vertical lines from it using the merged set of bounding boxes representing the detected lines.

2. The method of claim 1, wherein the plurality of binarization conditions are plurality of different binarization thresholds.

3. The method of claim 1, further comprising:
    prior to generating the plurality of binary images, deskewing, de-noising, and down-sampling the grayscale document image; and
    after the merging step, upsizing the merged set of bounding boxes.

4. The method of claim 1, wherein the detecting step for each binary image comprises:
    (a) obtaining a stroke width associated with each pixel of the binary image, wherein the stroke width associated with a given pixel is defined as a smaller one of horizontal and vertical runlengths of consecutive foreground pixels that include the pixel;
    (b) performing an opening operation on the binary image using a vertical line as a structuring element;
    (c) extracting connected components from the binary image generated by step (b); and
    (d) for each vertical column of pixels in each connected component, computing a ratio of a height of the column to a median value of the stroke widths associated with all pixels in the column, and removing the column of pixels from the binary image if the ratio is smaller than a predetermined threshold.

5. The method of claim 4, wherein the detecting step for each binary image further comprises, after step (d):

(e) projecting the binary image generated by step (d) vertically to generate a vertical projection histogram, and obtaining horizontal boundaries of all non-zero sections of the vertical projection histogram as left and right boundaries of the detected vertical lines.

6. The method of claim 5, wherein the detecting step for each binary image further comprises, after step (e):

(f) for each non-zero section of the vertical projection histogram, projecting a corresponding vertical slice of the binary image generated by step (d) horizontally to generate a first horizontal projection histogram, and projecting a corresponding vertical slice of the binary image prior to step (b) horizontally to generate a second horizontal projection histogram; and (g) for each non-zero section of the first horizontal projection histogram, identifying a corresponding non-zero section of the second horizontal projection histogram, and obtain its top and bottom boundaries as the top and bottom boundaries of the detected vertical line.

7. A computer program product comprising a computer usable non-transitory medium having a computer readable program code embedded therein for controlling a data processing apparatus, the computer readable program code configured to cause the data processing apparatus to execute a process for detecting and removing vertical and horizontal lines in a grayscale document image, the process comprising:

generating a plurality of binary images from the grayscale document image using a plurality of different binarization conditions;

detecting horizontal and vertical lines in each of the plurality of binary images independently, to generate a plurality of sets of bounding boxes corresponding to the plurality of binary images, each set of bounding boxes including a plurality of bounding boxes each representing a detected vertical or horizontal line;

merging the plurality of sets of bounding boxes into one merged set of bounding boxes representing vertical and horizontal lines detected in the grayscale image; and processing a binary image generated from the grayscale document image to remove horizontal and vertical lines from it using the merged set of bounding boxes representing the detected lines.

8. The computer program product of claim 7, wherein the plurality of binarization conditions are plurality of different binarization thresholds.

9. The computer program product of claim 7, wherein the process further comprises:

prior to generating the plurality of binary images, deskewing, de-noising, and down-sampling the grayscale document image; and after the merging step, upsizing the merged set of bounding boxes.

10. The computer program product of claim 7, wherein the detecting step for each binary image comprises:

(a) obtaining a stroke width associated with each pixel of the binary image, wherein the stroke width associated with a given pixel is defined as a smaller one of horizontal and vertical runlengths of consecutive foreground pixels that include the pixel;

(b) performing an opening operation on the binary image using a vertical line as a structuring element;

(c) extracting connected components from the binary image generated by step (b); and (d) for each vertical column of pixels in each connected component, computing a ratio of a height of the column to a median value of the stroke widths associated with all pixels in the column, and removing the column of pixels from the binary image if the ratio is smaller than a predetermined threshold.

11. The computer program product of claim 10, wherein the detecting step for each binary image further comprises, after step (d):

(e) projecting the binary image generated by step (d) vertically to generate a vertical projection histogram, and obtaining horizontal boundaries of all non-zero sections of the vertical projection histogram as left and right boundaries of the detected vertical lines.

12. The computer program product of claim 11, wherein the detecting step for each binary image further comprises, after step (e):

(f) for each non-zero section of the vertical projection histogram, projecting a corresponding vertical slice of the binary image generated by step (d) horizontally to generate a first horizontal projection histogram, and projecting a corresponding vertical slice of the binary image prior to step (b) horizontally to generate a second horizontal projection histogram; and (g) for each non-zero section of the first horizontal projection histogram, identifying a corresponding non-zero section of the second horizontal projection histogram, and obtain its top and bottom boundaries as the top and bottom boundaries of the detected vertical line.

\* \* \* \* \*